United States Patent [19]
Yamaguchi et al.

[11] Patent Number: 5,164,931
[45] Date of Patent: Nov. 17, 1992

[54] METHOD AND APPARATUS FOR CONTROL OF POSITIONING

[75] Inventors: Takashi Yamaguchi, Tsuchiura; Souichi Tohyama, Ibaraki; Hiromu Hirai, Tsukuba, all of Japan

[73] Assignee: Hitachi, Ltd., Tokyo, Japan

[21] Appl. No.: 682,262

[22] Filed: Apr. 8, 1991

[30] Foreign Application Priority Data

Apr. 6, 1990 [JP] Japan .................. 2-90329

[51] Int. Cl.⁵ ............................................ G11B 7/085
[52] U.S. Cl. ..................... 369/44.29; 369/44.35; 369/43; 369/32; 360/78.05; 360/78.06; 318/592
[58] Field of Search .............. 369/44.29, 44.31, 44.32, 369/44.35, 44.41, , 44.28, 32, 43, 47, 124; 360/77.01, 77.02, 77.08, 77.06, 78.01, 78.04, 78.05, 78.06; 318/592, 671, 677

[56] References Cited

U.S. PATENT DOCUMENTS 4,736,353 4/1988 Kasai et al. .................. 369/44.29
5,038,333 8/1991 Chow et al. .................. 369/44.29

FOREIGN PATENT DOCUMENTS 56-114176(A) 9/1981 Japan .
1-138666(A) 5/1989 Japan .

OTHER PUBLICATIONS

IBM Disk Storage Technology, Servo Design for an Eight-Inch Disk File, Robert D. Commander and J. R. Taylor, Feb., 1980, pp. 89–96.

Primary Examiner—Roy N. Envall, Jr.
Assistant Examiner—Mohammad Edun
Attorney, Agent, or Firm—Antonelli, Terry, Stout & Kraus

[57] ABSTRACT

Method and apparatus for control of positioning of a recording/playback head or other controlled object. When a controlled object reaches the vicinity of a target position, the control system is switched from operation as a velocity control system to operation as a position control system. By using state variables of the controlled object at that time, coefficients corresponding to the detected state variables are determined from characteristics of the controlled object which are determined in advance. By using the determined coefficient values, initial values upon start of position control of the position control system are set, and positioning control is then carried out.

7 Claims, 6 Drawing Sheets

METHOD AND APPARATUS FOR CONTROL OF POSITIONING

BACKGROUND OF THE INVENTION

The present invention relates to method and apparatus for control of positioning, and more particularly to method and apparatus for positioning control of a head in an optical disk device or a magnetic disk device.

In a magnetic disk device, with the aim of recording information at a predetermined position on the recording surface of a recording medium or reading information already recorded, positioning control is carried out to move and position a magnetic head to a predetermined track. In this case, it is general practice to conduct positioning control by performing switching between a plurality of control systems in accordance with the difference between the present position of the head standing for a controlled object, and a target position (target track).

Namely, when the difference between the present position and the target position exceeds a predetermined value, control is performed by using a velocity control system on the basis of a target velocity corresponding to the difference. As the head approaches the target position, positioning control is performed by using a position control system on the basis of the difference between the present position and the target position. The above method is effective to achieve fast and accurate positioning to the target position.

Thus, switching is effected from the velocity control system to the position control system, and if initialization in the position control system is improper, transient characteristics during switching between the control systems cause a response waveform of the head to oscillate or to be delayed, and much time is needed for positioning to the predetermined position.

In the past, some methods to solve these problems have been proposed. For example, JP-A-56-114176 discloses a method of improving response time after switching from the velocity control system to the position control system. In this proposal, a voltage proportional to a motor speed immediately before switching is stored in an integrator included in the position control system.

JP-A-1-138666 discloses a method to minimize transient response immediately after switching to the position mode. In this proposal, capacitors of integrators included in the position control system are charged with transient response correction values for individual tracks. These values are used as initial values of the integrators immediately after switching to the position control system.

In the above prior art, an the integrator is provided in the position control system, and an initial value is set in the integrator to ensure smooth and fast response upon switching.

Also, in the prior art, setting of an optimal initial value can be realized under the condition that characteristics of the movable part, including the head standing for the controlled object, are known, and besides the characteristics do not change when the movable part is moved to another position.

Practically, however, the force constant of the motor adapted to move the head and the gain of the power amplifier are not constant. For example, in a voice coil motor frequently used as an actuator for moving the head of magnetic disk device, the force constant of the motor is decreased under the influence of leakage of magnetic flux at the motor end.

In the case of a magnetic disk device of the so-called sector servo scheme wherein servo data is recorded in the form of a sector on the disk surface and positioning of the head is carried out by reading the data, position sensitivity may differ for the inner zone and the outer zone of the disk depending on the manners of writing the servo signals. Thus, in general, characteristics of the controlled object change, and the loop gain of the control system changes. Accordingly, in the initial value setting for the integrator according to the conventional method, coefficients in a computation equation used for initial value computation deviate from actual values, and as a result, the determined initial values may sometimes not be optimal values, making it difficult to achieve smooth switching from the velocity control system to the position control system.

In addition, the mechanical system of the controlled object has a plurality of natural frequency modes, and when the results of the theoretical calculation without taking the natural frequency modes into consideration are applied directly, satisfactory response sometimes cannot be obtained.

SUMMARY OF THE INVENTION

An object of the invention is to provide method and apparatus which can permit fast and highly accurate positioning control by ensuring smooth switching to a position control system in a system having a velocity control system and a position control system.

In accordance with a preferred embodiment of the invention, when a controlled object reaches the vicinity of a target position, the control system is switched from a velocity control system to a position control system. By using state variables of the controlled object at that time, coefficients corresponding to the detected state variables are determined from characteristics of the controlled object which are known in advance. By using the determined coefficient values, initial values upon start of position control of the position control system are set, and positioning control is then carried out.

In accordance with another preferred embodiment of the invention, a correction amount for a control signal of a position controller is determined from state variables of the controlled object detected upon switching to position control and from coefficients concerning characteristics of the controlled object. Then, highly accurate and fast positioning control is carried out by using the correction amount.

DESCRIPTION OF THE PREFERRED EMBODIMENTS

Figure 1:
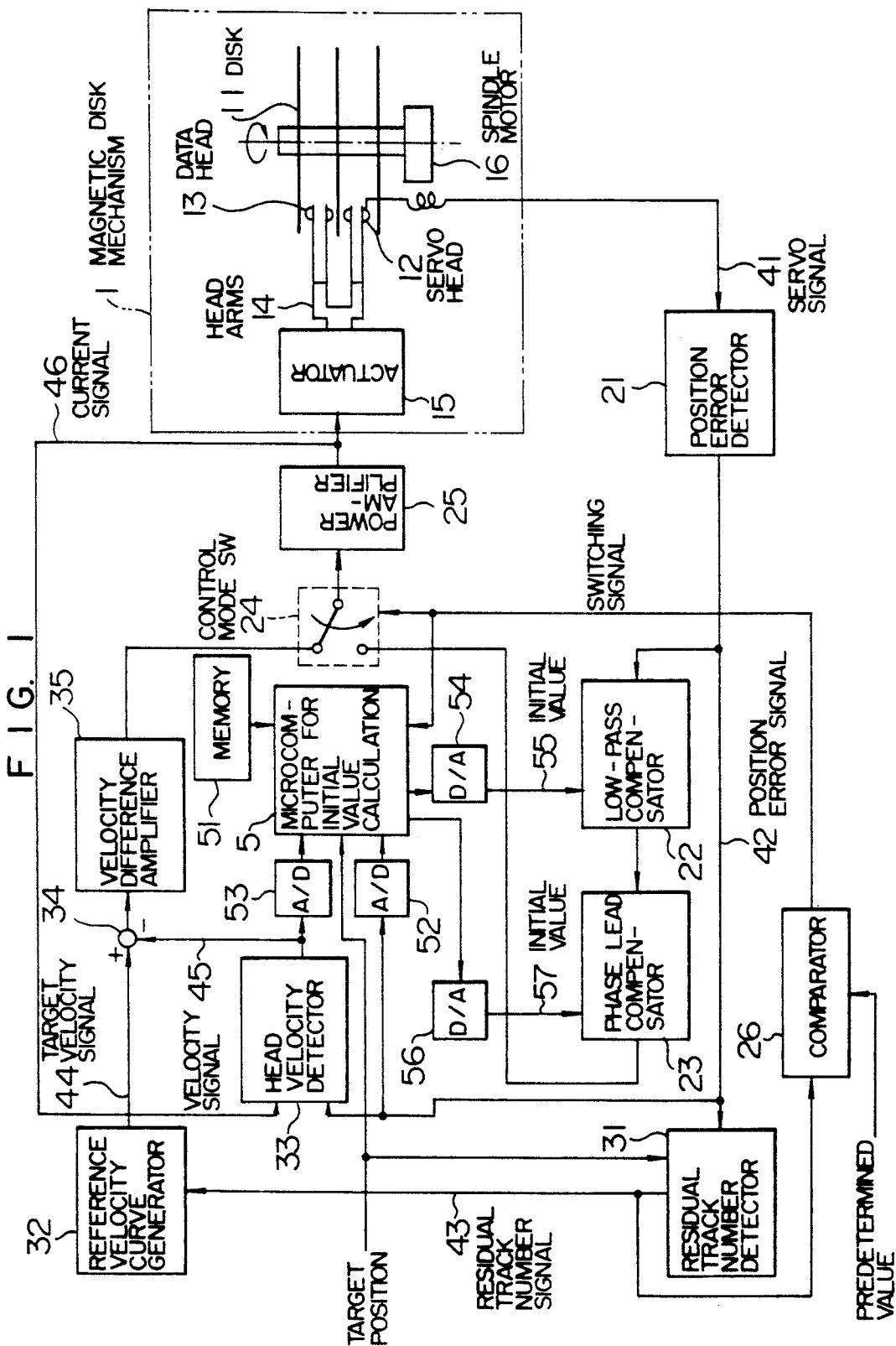
FIG. 1 is a block diagram showing a first embodiment of the invention as applied to a head positioning system of a magnetic disk device.

Referring to FIG. 1, a magnetic disk mechanism 1 includes a plurality of magnetic disks 11 mounted on a shaft driven by a spindle motor 16, heads 12 and 13 movable from outer zone to inner zone of the disks 11 or vice versa to read/write information from/on the disks 11, head arms 14 for carrying the heads, and an actuator 15 which drives the head arms 14 mounted with the heads to effect movement thereof. In this embodiment, a so-called dedicated servo scheme is employed in which a disk storing a servo signal is provided, the servo signal stored in the disk is read by a servo head 12, and the present position of the head is recognized from the read-out signal to carry out position control.

A position error detector 21 receives the servo signal 41 and delivers a position signal 42 representative of a head position or distance from the track center.

A residual track number detector 31 receives the position signal 42 to detect the difference between a target position (target track) and the present position, that is, the number of residual tracks. The present position corresponds to the position signal 42 which varies each time the head passes one track; that is the position signal 42 depends upon the number of pulses generated upon passage of the head over tracks. The value of a target position is applied from a controller, not shown, and a residual track number signal 43 is delivered as a difference between that value and the present position.

A reference velocity curve generator 32 receives the residual track number signal 43 and delivers a target velocity signal 44 determined in accordance with the number of residual tracks.

A head velocity detector 33 is adapted to detect the velocity of the moving head, and in this embodiment it receives the position signal 42 and an output signal 46 of a power amplifier 25 to calculate a velocity signal 45 on the basis of these input signals.

More specifically, the head velocity detector 33 includes a differentiator for receiving and differentiating the position signal 42, an integrator for receiving and integrating the current velocity signal 46, and a circuit for receiving and synthesizing output signals of the differentiator and integrator. Such a velocity detector is disclosed in, for example, IBM Disk Storage Technology, published in February, 1980, pp. 89-96.

An adder 34 produces a signal indicative of the difference between the detected velocity signal 45 and the target velocity signal 44, that is, a velocity difference signal. A velocity difference amplifier 35 amplifies the velocity difference signal to deliver a velocity control signal.

Figure 2:
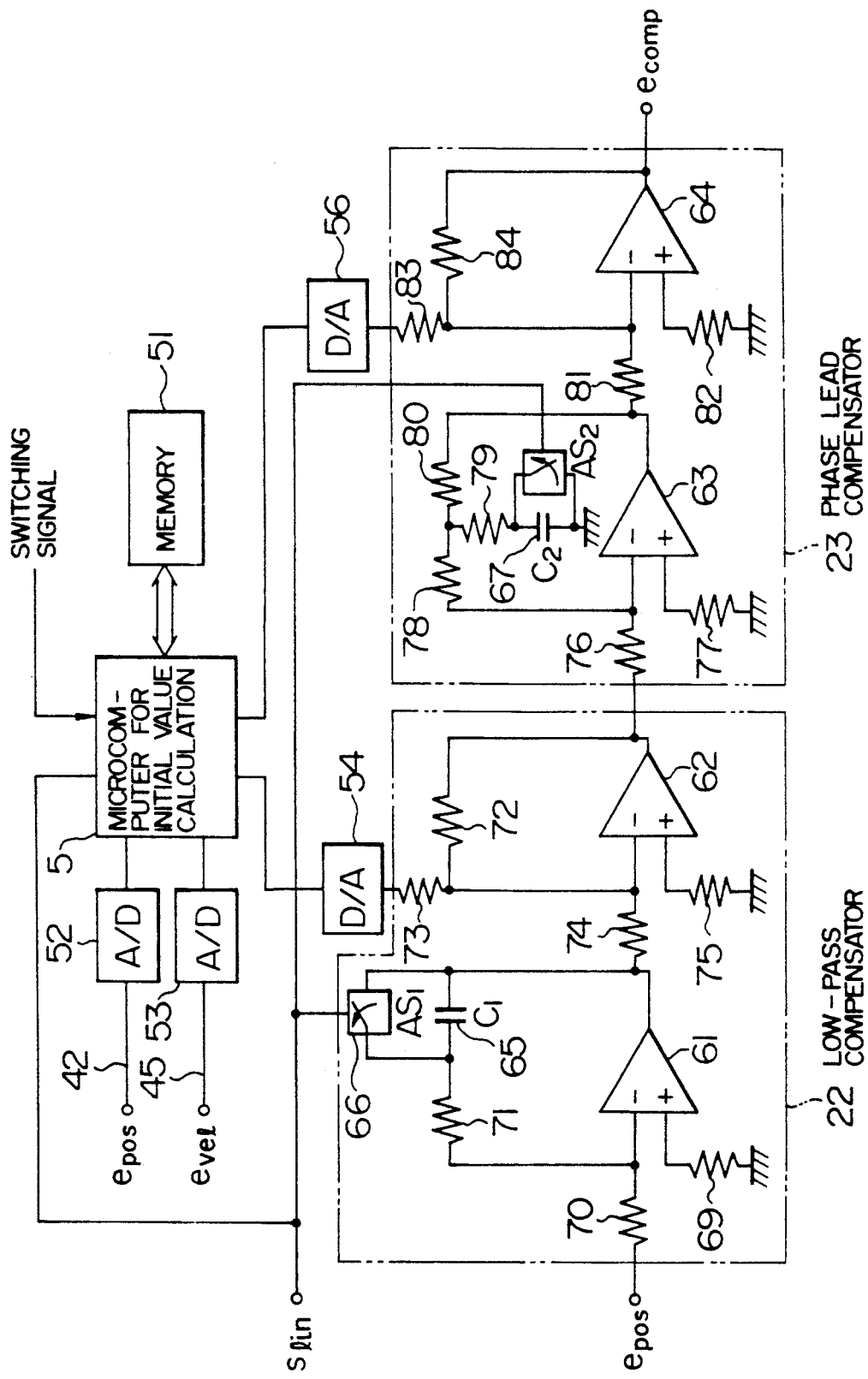
FIG. 2 is a diagram illustrating details of a phase lead compensator and a low-pass compensator which are associated with an initial value setting circuit as shown in FIG. 1.

Two compensators 22 and 23 shown in FIG. 1 will now be detailed with reference to FIG. 2.

The low-pass compensator 22 is comprised of operational amplifiers 61 and 62, a switch 66, a capacitor 65 and resistors 69 to 75. Of the above components, the operational amplifier 61, capacitor 65 and resistors 69 to 71 provide low-pass compensation characteristics. The switch 66 is operable to discharge voltage charged in the capacitor 65 when setting an initial value. The operational amplifier 62 and resistors 72 to 75 constitute an adder which applies the initial value received through a D/A (digital/analog) converter 54.

Similarly, the phase lead compensator 23 is comprised of operational amplifiers 63 and 64, a switch 68, a capacitor 67 and resistors 76 to 84. Of the above components, the operational amplifier 63, capacitor 67 and resistors 76 to 80 provide phase lead characteristics. The switch 68 is operable to discharge voltage charged in the capacitor 67 upon setting of an initial value. The operational amplifier 64 and resistors 81 to 84 constitute an adder which applies the initial value received through a D/A converter 56.

The two compensators 22 and 23 operate as will be described below.

Since the low-pass compensator 22 is constructed of the single lead element and the integrator, it functions to increase the gain over the range of low frequencies so as to suppress the influence of disturbance in the low frequency range. Preferably, the single lead element has a time constant which is substantially equal to or less than that of a single lead element included in the phase lead compensator 23.

Since the phase lead compensator 23 is constructed of the single lag element and the afore-mentioned single lead element which has a longer time constant than that of the single lag element, it acts to lead the phase to thereby enhance stability of the control system. Preferably, the time constant of the single lead element may be set to about 20 times as large as that of the single lag element. The frequency at which the maximum phase angle occurs is made to be coincident with the zero crossing frequency of the position control system.

Returning to FIG. 1, a control mode switch 24 is adapted to perform switching between the velocity control system and the position control system, and it switches from velocity control to position control when the output signal of the residual track number detector 31 reaches a predetermined value (predetermined residual track number). A comparator 26 receives the output from residual track number detector 31 and the predetermined value and actuates control mode switch 24.

A power amplifier 25 amplifies an inputted control signal from control mode switch 24 and delivers current to the actuator 15.

A/D (analog/digital) converters 52 and 53 convert input analog quantities into digital quantities.

D/A converters 54 and 56 convert digital quantities into analog quantities.

A microcomputer 5 for calculation of initial values computes initial values for the compensators 22 and 23 and delivers the computed values thereto through D/A converters 54 and 56, respectively. For computation of initial values, the microcomputer 5 receives the head velocity signal 45 through the A/D converter 53 and the position signal 42 through the A/D converter 52. A memory 51 stores constants and like data necessary for programs and operations used to operate the microcomputer 5. The operation procedure of this microcomputer 5 will be described later.

In the construction shown in FIG. 1, the velocity control system is constructed of the position error detector 21, residual track number detector 31, reference velocity curve generator 32, head velocity detector 33, adder 34, velocity difference amplifier 35, power amplifier 25 and actuator 15.

The position control system is, on the other hand, constructed of the position error detector 21, low-pass compensator 22, phase lead compensator 23, power amplifier 25 and actuator 15.

The control mode switch 24 performs switching between the velocity control system and the position control system. The microcomputer 5 computes and sets an initial value for the position control system when the control mode is switched to the position control system.

Figure 3:
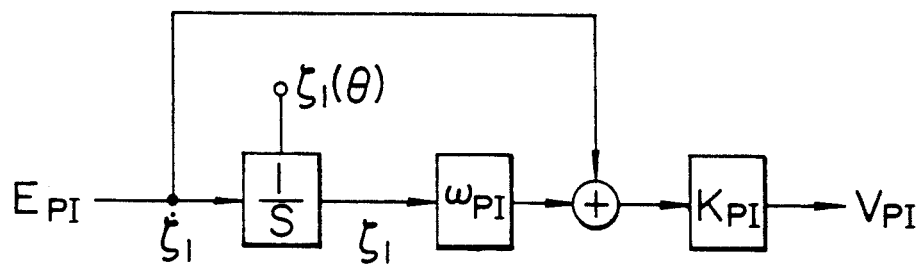
FIG. 3 is a block diagram of the low-pass compensator shown in FIG. 1.
Figure 4:
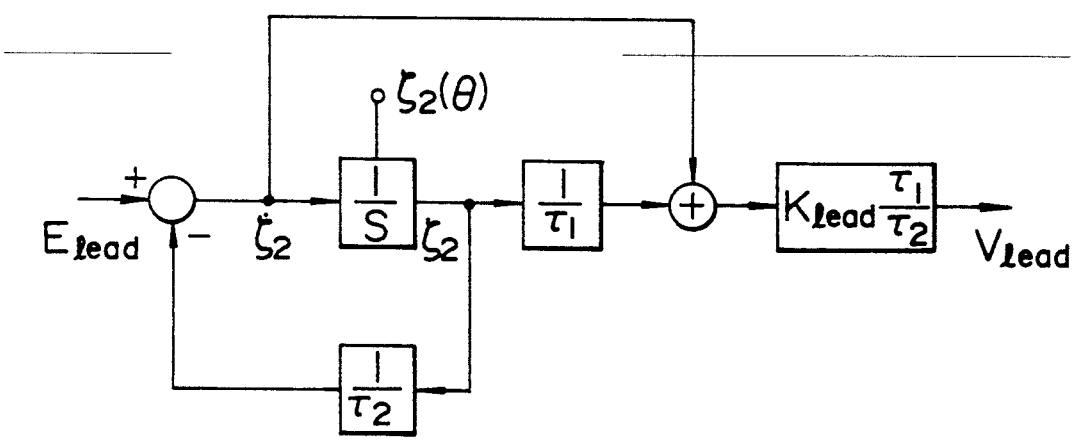
FIG. 4 is a block diagram of the phase lead compensator shown in FIG. 1.

The position control system will now be described in greater detail. As described previously, the position control system includes the low-pass compensator 22 and phase lead compensator 23 which are connected in series. The functional construction of the former compensator can be depicted in block diagram form as shown in FIG. 3, and the functional construction of the latter can be depicted in block diagram form as shown in FIG. 4. In these Figures, S denotes the Laplace operator, 1/S represents an integrator, $\omega_{pl}$ denotes the cutoff frequency of the low-pass compensator 22, and $\tau_1$ and $\tau_2$ denote reciprocals of cutoff frequencies of the phase lead compensator 23. As shown, each of the compensators includes an integrator, and the position control system as a whole has two integrators C1 and C2 in the compensators. It is a matter of importance what initial values should be set when the integrators are switched.

The principle of setting the initial values of the two compensators shown in FIG. 1 will now be described with reference to FIG. 2.

In effect, initial values of the integrators are voltages charged on capacitors C1 and C2. Accordingly, before the control system is switched to the position control system, the switches AS1 and AS2 are closed to make zero charge voltages in the capacitors C1 and C2.

When the control system is switched to the position control system, the switches AS1 and AS2 are opened, and concurrently therewith initial values are added to the capacitors C1 and C2 from the D/A converters 54 and 56. Through the above operation, setting of the initial values is completed.

In the microcomputer 5, computation of initial values is carried out, as will be described below. It is assumed that the velocity control system is switched to the position control system at a time point t=0. Given that in the position control system the head position at time t is x(t) and at t=0, the head position, head velocity and internal variables of the integrators of compensators are x(0), v(0), $\zeta_1(0)$ and $\zeta_2(0)$, respectively, x(t) is given by the following equation:

$$x(t) = \sum_n Kn(x(0), v(0), \zeta_1(0), \zeta_2(0))e^{-\lambda n t} \tag{1}$$

where Kn represents coefficient and $\lambda$ n represents the eigenvalue of the position control system. This equation indicates that the head position is a function of the initial values of the head position, velocity and internal variables.

Since x(t) indicates behavior of the settlement of the head starting at t=0, the trajectory of x(t) is controlled to converge to a target value smoothly at the fastest speed. The following performance index I is then introduced:

$$I = \int_0^{T_0} X^T Q X \, dt \tag{2}$$

where $X$ represents a state vector which is a 4×1 vector containing two internal variables, namely position and velocity, Q represents a 4×4 square matrix serving as a coefficient for weighting individual variables, and $X^T$ is a transpose matrix of $X$. The performance index I corresponds to a double integration of head position over an interval between time immediately after the control mode switching and time $T_0$. Initial values of the internal variables $\zeta_1(0)$ and $\zeta_2(0)$ which minimize the performance index are given by equation (4) which gives a solution, in the form of simultaneous equations, to equation (3):

$$\frac{\partial I}{\partial \zeta_1(0)} = 0 \text{ and } \frac{\partial I}{\partial \zeta_2(0)} = 0 \tag{3}$$

$$\left. \begin{array}{l} \zeta_1(0) = \alpha_1 x(0) + \beta_1 v(0) \\ \zeta_2(0) = \alpha_2 x(0) + \beta_2 v(0) \end{array} \right\} \tag{4}$$

where $\alpha_1$, $\beta_1$, $\alpha_2$ and $\beta_2$ are constants determined by position sensitivity Kp and force constant $K_F$. In this manner, initial values of the internal variables $\zeta_1(0)$ and $\zeta_2(0)$ can be determined in the form of a linear function of position x(0) and velocity v(0) at the instant of control mode switching. The above is the basic operation of initial value setting.

Incidentally, the coefficients contained in equation (4) are determined from constants of individual components of the mechanical system, but as described previously the constants of the mechanical system change with the track position of the head. For example, the force constant of the actuator is more affected by leakage of magnetic flux as the head approaches the inner or outer zone edge, having a tendency toward decrease. Depending on the manner of writing tracks, the pitch between adjacent tracks is different for the inner and outer zones, and so the gain (position sensitivity) of the position error detector 21 is also different at the inner and outer zones. Thus, the actual constants which differ for different track positions do not coincide with the design constants of the mechanical system used for computation of the constants in equation (4), and response of the head position sometimes cannot be optimal. Otherwise, there is a possibility that excessive overshoot may occur.

Thus, to comply with gain variations which depend on the track position and which are known in advance, a table indicating the coefficients in equation (4) and corresponding to head positions is stored in the memory 51 of FIG. 1, and the coefficients are read and used for the microcomputer 5 to compute equation (4). In this manner, regardless of gain variations caused depending on the track position, optimal positioning characteristics can be obtained to advantage.

The operation of the construction shown in FIG. 1 will now be described.

Firstly, when a target position is designated by the controller, not shown, the residual track number detector 31 delivers a residual track number 43 representative of the difference between the present position, determined on the basis of a position signal 42 for the head, and the target position. At that time, the comparator 26 receives the residual track number, which is normally larger than a predetermined value also applied to the comparator 26. Consequently, the control mode switch 24 is switched to the velocity control system side. The reference velocity curve generator 32 generates a target velocity signal 44 in compliance with the residual track number signal. Responsive to this target velocity signal, the velocity control system drives the actuator 15 to move the heads 12 and 13. The head velocity detector 33, receiving the position signal 42 and an output signal 46 of the power amplifier 25, detects the moving velocity of the head (head velocity) in accordance with the previously-described relationship. The adder 34 calculates the difference between the target velocity signal and the head velocity, that is, a velocity error. The amplifier 35 supplies a control signal to the power amplifier 25 so that the velocity error may be made to be zero. The power amplifier 25 uses this control signal to supply to the actuator 15 a power level by which the head velocity can coincide with the target velocity. The actuator 15 then generates a driving force conformable to the power level to move the head arms 14.

During the above period, the microcomputer 5 for computation of initial values makes preparations, to be described below, for computation of initial values which are to be set in the two compensators 22 and 23 of the position control system upon switching from the velocity control system to the position control system.

Figure 5:
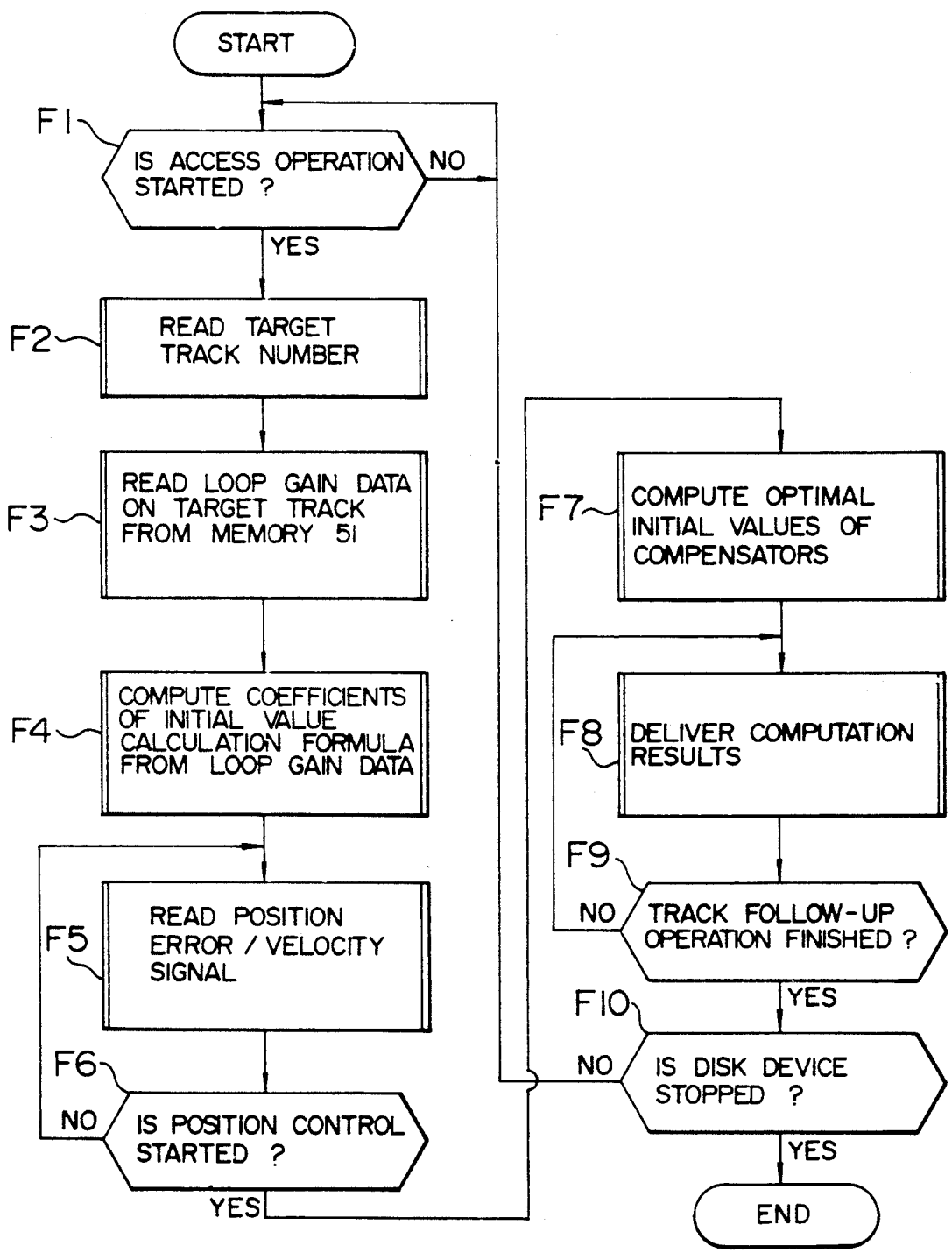
FIG. 5 is a flow chart of a program for computing and delivering initial values in the first embodiment shown in FIG. 1.

The operational flow in the microcomputer 5 is shown in FIG. 5. Referring to FIG. 5, operations in steps F1 to F6 are preparative operations to the initial value computation. More particularly, the microcomputer 5 carries out the operations in steps F1 to F6 during this seek operation period in accordance with an operational program stored in the memory 51. It is first checked to determine whether a command for moving the position of the head is issued. This processing corresponds to the operation in step F1. The presence or absence of the command for operation may be determined directly by using a command from the controller, but in the present embodiment a target position for movement is set by using the controller. Accordingly, inputting of the target position completes the procedure through step F2 inclusive. Subsequently, the microcomputer 5 reads precedently stored loop gain data on a target track from the memory 51. This processing is conducted in step F3 in FIG. 5.

On the basis of the read-out data, the microcomputer 5 computes coefficients $\alpha_1$, $\beta_1$, $\alpha_2$ and $\beta_2$ in the initial value computation formula represented by equation (4). This processing is conducted in step F4 in FIG. 5. These coefficients have values suitable for application to the target track position. The coefficients can be determined by computing equations (9) which can be obtained in accordance with the following procedure. On the assumption that the controlled object is an inertial body, and its gain is $K_P$ and the low-pass and phase lead compensators are added, the closed loop system has a state equation given by equation (5):

$$\frac{d}{dt} \bar{X} = \mathbb{A} \bar{X} \quad (5)$$

where $\mathbb{A}$ is representative of equation (6):

$$\mathbb{A} = \begin{bmatrix} 0 & 1 & 0 & 0 \\ -K_L K_{PI} K_P & 0 & K_P K_{PI}\omega_{PI} & K_P K_{PI} K_L \left(\frac{1}{\tau_1} - \frac{1}{\tau_2}\right) \\ -K_L & 0 & 0 & K_L \left(\frac{1}{\tau_1} - \frac{1}{\tau_2}\right) \\ -1 & 0 & 0 & \frac{1}{\tau_2} \end{bmatrix} \quad (6)$$

where $$K_L = K_{lead}\frac{\tau_1}{\tau_2},$$

and since the target value is the track center, the reference of this system is zero.

The performance index given by equation (2) can be reduced to equation (7) by using well known Lyapunov's equation:

$$I = \bar{X}^T(0)\mathbb{P}\bar{X}(0) \quad (7)$$

Accordingly, equation (7) is solved in accordance with equation (3) and there results equation (8):

$$\left.\begin{array}{l} \frac{\partial}{\partial \zeta_1(0)} \bar{X}^T(0)\mathbb{P}\bar{X}(0) = 0 \\ \frac{\partial}{\partial \zeta_2(0)} \bar{X}^T(0)\mathbb{P}\bar{X}(0) = 0 \end{array}\right\} \quad (8)$$

where $\mathbb{P}$ satisfies $\mathbb{P}\mathbb{A} + \mathbb{A}^T \mathbb{P} = -Q$.

Given that each element of $\mathbb{P}$ is represented by $P_{ij}$, equation (8) can be solved to provide the following equations (9):

$$\left.\begin{array}{l} \alpha_1 = \frac{1}{(P_{12} + P_{21})^2 - 4P_{11}P_{22}} \{2P_{22}(P_{13} + P_{31}) - (P_{12} + P_{21})(P_{23} + P_{32})\} \\ \beta_1 = \frac{1}{(P_{12} + P_{21})^2 - 4P_{11}P_{22}} \{2P_{22}(P_{14} + P_{41}) - (P_{12} + P_{21})(P_{24} + P_{42})\} \\ \alpha_2 = \frac{1}{(P_{12} + P_{21})^2 - 4P_{11}P_{22}} \{2P_{11}(P_{23} + P_{32}) - (P_{12} + P_{21})(P_{13} + P_{31})\} \\ \beta_2 = \frac{1}{(P_{12} + P_{21})^2 - 4P_{11}P_{22}} \{2P_{11}(P_{24} + P_{42}) - (P_{12} + P_{21})(P_{14} + P_{41})\} \end{array}\right\} \quad (9)$$

If there is not sufficient time for computation of equations (9), the relation of $\alpha_1$, $\beta_1$, $\alpha_2$ and $\beta_2$ to the loop gain is determined in advance, and in step F4 the coefficients can be determined by looking up this relation.

When processing through step 4 inclusive ends, the microcomputer 5 fetches the time-varying position signal (output signal of detector 21) and head velocity (output signal of detector 33) at predetermined intervals of time and waits for the signal for switching from the velocity control system to the position control system. The switching processing is conducted in steps F5 and F6. The timing for switching is determined by delivery of a switching signal from the comparator 26.

Operation for switching will now be described. To perform switching from the velocity control system to the position control system, the control mode switch 24 is transferred by a switching signal from the comparator 26. At that time, the microcomputer 5 receives the switching signal and knows that position control is commencing. This causes the microcomputer 5 to compute initial values to be set in the compensators 22 and 23 by using equation (4). This processing is conducted in step F7 in FIG. 5. Values previously determined in step 4 are used for the coefficients contained in equation (4). Accordingly, by using the values of the coefficients complying with the target position to which the head should be moved, initial values $\zeta_1(0)$ and $\zeta_2(0)$ pursuant to equation (4) can be determined. The results of the computation are delivered through the D/A converters 54 and 56 and set in the compensators 22 and 23. This is conducted in step F8 in FIG. 5.

The position control system set with the initial values drives the actuator 15 such that the value of position signal 42 can be made to be zero, thus carrying out operation for bringing the head into coincidence with the track center. In particular, the position signal 42 is converted by the compensator 22 and 23 into a position control signal which in turn is amplified by the power amplifier 25 to provide a necessary amount of current supplied to the actuator 15. As a result, the actuator 15 moves the heads carried on the head arms in accordance with the current to thereby perform position control.

In the present embodiment, the initial values complying with the target position can be set suitably in the respective compensators upon switching to the position control system, and the switching can be done smoothly.

After the heads reaches the target position, operation is carried out under the direction of the controller, not shown, to read data recorded on the target track of the disk through the head or conversely to record data to be recorded on the target track through the head. During the period for reading or recording by the head, the position control system continues performing position control such that the head is positioned at the target track center.

When reading or recording on that track ends, the procedure is brought into a state of waiting for accessing the next track. Under this condition, the microcomputer 5 operates to effect processing as in steps F9 and F10. When a command for moving the head to the next target track is issued, the above-described operation is repeated. The series of operations continues until a command for stopping the disk device is issued.

Figure 7:
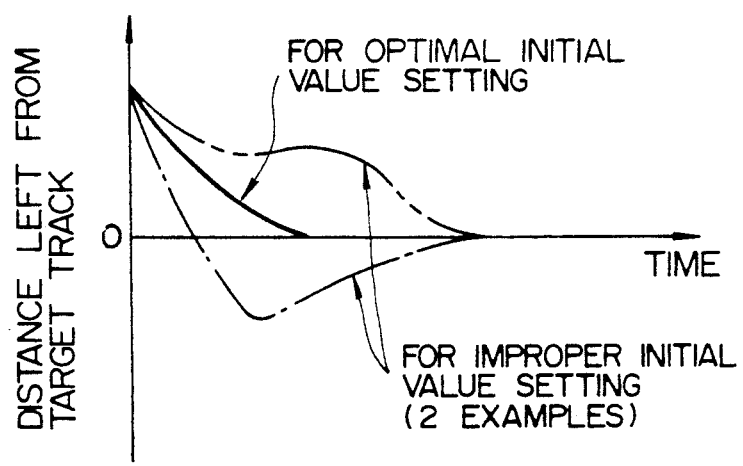
FIG. 7 is a graph showing an example of a response waveform obtained with head positioning according to the invention.

FIG. 7 graphically shows curves of positioning of the head center to the target position respectively obtained with proper initial value setting and improper initial value setting upon switching to the position control system. As depicted, when the initial values are set properly, positioning to the target track can be accomplished within a very short period of time, evidencing that setting of initial values is important for fast positioning.

Figure 6:
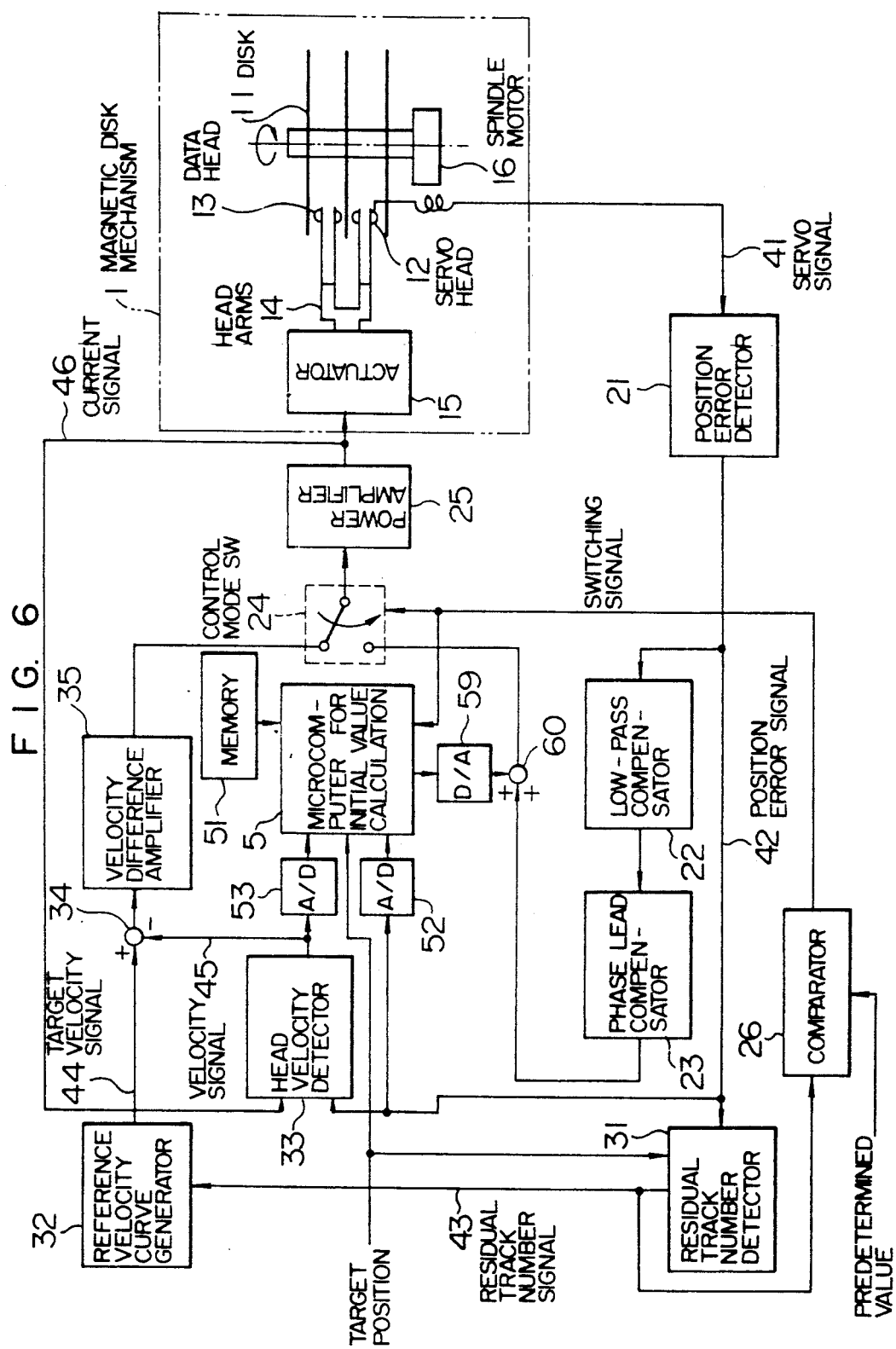
FIG. 6 is a block diagram showing a second embodiment of the invention as applied to the head positioning system of a magnetic disk device.

A second embodiment of the invention is shown in FIG. 6. Referring to FIG. 6, a D/A converter 59, like the D/A converters 54 and 56 shown in FIG. 1, converts digital signals into analog signals. An adder 60 adds the output signal of phase lead compensator 23 and an analog signal converted from an output of microcomputer 5. The remaining components are all identical to those in FIG. 1.

Accordingly, the difference between the embodiments shown in FIG. 1 and FIG. 6 resides in that while in the former initial values to be set in the compensators are determined and the determined initial values are set in the compensators to provide stable control upon switching, the latter replaces the computation of initial values of the compensators with direct correction of a control signal so that the control signal is optimized upon switching between the control systems.

More specifically, in the embodiment shown in FIG. 6, the microcomputer 5 determines a correction, which permits the control signal to have a response optimized for switching, and supplies the correction to the adder 60 through the A/D converter 59 to correct the control signal.

The second embodiment operates as follows,

Firstly, a target position is designated from the controller. The operation of the velocity control system is the same for both the embodiments shown in FIG. 6 and FIG. 1.

During velocity control, the microcomputer 5 fetches data, such as loop gain at the target position, from the memory 51, and as in the embodiment shown in FIG. 1 computes coefficients used for computation of a correction signal. The manner of determining coefficients will be described with the aid of the description of the first embodiment.

In the present embodiment, the correction signal from the microcomputer 5 is inputted during position control, and with the correction signal designated by w, equation (1) is reduced to the following equation:

$$x(t) = \sum_n K_n (x(0), v(0), \zeta_1(0), \zeta_2(0), w(0)) e^{-\lambda_n t} \quad (10)$$

In respect of equation (10), a performance index as represented by equation (2) is defined, and w(0) is determined which minimizes the performance index. Since initial values $\zeta_1(0)$ and $\zeta_2(0)$ of internal variables $\zeta_1$ and $\zeta_2$ of the compensators 22 and 23 are zero at the time of switching as in the case of the first embodiment, x(t) of equation (10) is a function of the head initial position x(0), head initial velocity v(0) and compensation signal w(0). Thus, an initial value of correction signal w which minimizes the performance index is given by $$\frac{\partial I}{\partial w(0)} = 0. \quad (11)$$

Equation (11) is solved and there results $$w(0) = \gamma x(0) + \delta v(0) \quad (12)$$

where $\gamma$ and $\delta$ are constants determined by position sensitivity $K_P$ and force constant $K_F$ of the actuator.

When the velocity control system is switched to the position control system in the same manner as in the first embodiment under the condition that the coefficients are determined during the period of velocity control as described above, the microcomputer 5 computes equation (10) and supplies the computation results to the adder 60 through the D/A converter 59. Subsequently, the position control system operates in the same manner as in the first embodiment.

As described above, in the second embodiment of the invention shown in FIG. 6, switching from the velocity control system to the position control system can be effected smoothly by suitably adding the aforementioned correction signal to the output signal from the phase lead compensator 23, thereby making it possible to reduce the time required for the subsequent settlement of the head.

In the foregoing embodiments, the computation of coefficients is carried out on the basis of values precedently given in the form of a table in the memory. Alternatively, however, a parameter identification algorithm may be set in the microcomputer 5 in order that in compliance with gain variations with time, corresponding coefficients in equation (4) can be determined in advance.

Further, in order to follow the differences in gain due to individuality of devices, coefficients in equation (4) can be re-set by measuring the gain under the condition that the parameter identification algorithm is brought to effect upon start.

In the parameter identification method, any of various types of algorithm, such as the least square estimation method known in modern control theory, may be used.

In the foregoing first and second embodiments, the compensation element of the position control system is constructed of an analog circuit, and the computation of the algorithm for initial value setting is processed by the microcomputer. However, the present scheme can be applied in a similar manner even to a digital control system in which operation processing is undertaken by the microcomputer for all components of the position control system including the compensation elements.

In the case of a digital control system, initial values are given through operation processing, and therefore the analog switches, D/A converters and operational amplifiers for addition can be dispensed with. Also, since all processing during control mode switching can be effected within the sampling period, such a delicate shift in timing as observed in analog circuit systems need not be taken into consideration.

The present invention can also be applied to head operation as below. More particularly, because of nonuniform thermal deformation of members constituting the head arms 14 shown in FIG. 1, the data head 13 sometimes deviates from the track center even when the servo head 12 follows the target track center. To cope with this problem, a method may be employed wherein a value of deviation is obtained by, for example, detecting a position signal precedently written in part of the disk in question, and the positional deviation is corrected under the direction of a correction command from a host controller. In such an operation, the method described in connection with the foregoing embodiments may be used to permit fast positioning.

Further, in a magnetic disk device head positioning scheme called a sector servo scheme, the position signal is written precedently on all of the disk surfaces. Accordingly, when reading or recording of data is carried out between tracks of the same track number on the surfaces of different disks, head switching operation occurs. In such an operation, if tracks of the same track number are equally distant from the respective disk center, no problem arises. But in fact, because of thermal deformation and the like, a positional offset takes place even between tracks of the same track number on the surfaces of the individual disks, with the result that upon head switching, the switched head must sometimes be so positioned as to be a different distant from the track center. In such an operation, with the aid of the initial value setting or the addition operation of the correction signal according to the teachings of the present embodiment, positioning after head switching can be accomplished smoothly within a short period of time.

We claim:

1. A positioning control apparatus for moving and positioning a controlled object from the present position of the controlled object to a target position, said positioning control apparatus comprising:
    an actuator for moving the controlled object;
    means for providing a present position signal indicative of the present position of the controlled object;
    means for providing a target position signal indicative of the target position;
    means responsive to the present position signal and the target position signal for providing a position error signal indicative of the difference between the present position and the target position;
    velocity control means responsive to the present position signal for providing a velocity control signal to control the velocity of the controlled object;
    position control means responsive to the present position signal for providing a position control signal to control the position of the controlled object;
    switching means capable alternatively of assuming a first condition coupling said actuator to said velocity control means for application of the velocity control signal to said actuator, to cause said actuator to move the controlled object toward the target position, and of assuming a second condition coupling said actuator to said position control means for application of the position control signal to said actuator, to cause said actuator to move the controlled object to the target position, said switching means responsive to the position error signal for selectively assuming one of the first condition and the second condition;
    computing means responsive to state variables of the controlled object and to coefficients indicative of characteristics of the controlled object for computing initial values, responsive to the target position signal for adjusting the coefficients prior to the computing of the initial values, and responsive to said switching means assuming the second condition for applying the computed initial values to said position control means to adjust the position control signal.

2. A positioning control apparatus according to claim 1 wherein said position control means includes a phase lead filter and means for setting applied initial values in said phase lead filter.

3. A positioning control apparatus according to claim 1 wherein said computing means includes means for storing the coefficients in association with the target position, means for receiving the target position signal, and means responsive to receipt of the target position signal for utilizing the coefficients associated with the target position indicated by the received target position signal in computing of the initial values.

4. A positioning control apparatus for moving and positioning a controlled object from the present position of the controlled object to a target position, said positioning control apparatus comprising:
    an actuator for moving the controlled object
    means for providing a present position signal indicative of the present position of the controlled object;
    means for providing a target position signal indicative of the target position;
    means responsive to the present position signal and the target position signal for providing a position error signal indicative of the difference between the present position and the target position;

velocity control means responsive to the present position signal for providing a velocity control signal to control the velocity of the controlled object;

position control means responsive to the present position signal for providing a position control signal to control the position of the controlled object;

switching means capable alternatively of assuming a first condition coupling said actuator to said velocity control means for application of the velocity control signal to said actuator, to cause said actuator to move the controlled object toward the target position, and of assuming a second condition coupling said actuator to said position control means for application of the position control signal to said actuator, to cause said actuator to move the controlled object to the target position, said switching means responsive to the position error signal for selectively assuming one of the first condition and the second condition;

computing means for providing a correction amount signal based on state variables of the controlled object and on coefficients indicative of characteristics of the controlled object; and correction means responsive to said switching means assuming the second condition for applying the correction amount signal to said position control means to correct the position control signal by a correction amount represented by the correction amount signal so as to stabilize operation of said position control means.

5. A positioning control method for moving and positioning a controlled object from the present position of the controlled object to a target position, said method comprising the steps of:

determining a position error between the present position of the controlled object and the target position;

determining a switching position for the controlled object, the switching position being within a preset distance of the target position;

moving the controlled object toward the target position in a velocity control mode until the controlled object reaches the switching position, the velocity control mode causing the velocity of the controlled object to be brought into coincidence with a reference velocity, the reference velocity being based on the difference between the present position and the target position;

determining initial values based on state variables of the controlled object and on coefficients indicative of characteristics of the controlled object;

subsequent to the controlled object reaching the switching position, moving the controlled object to the target position in a position control mode, the position control mode being based on the initial values and serving to adjust the position of the controlled object toward the target position until the difference between the present position of the object and the target position is zero.

6. A positioning control method for moving and positioning a controlled object from the present position of the controlled object to a target position, said method comprising the steps of:

determining a position error between the present position of the controlled object and the target position;

moving the controlled object toward the target position while controlling the velocity of the controlled object when the position error exceeds a predetermined value to bring the velocity of the controlled object into coincidence with a reference velocity determined on the basis of the position error;

computing coefficients corresponding to the target position; computing initial values on the basis of the position error, when the position error equals the predetermined value, and on the basis of the computer coefficients;

after the position error equals the predetermined value, moving the controlled object to the target position on the basis of the initial values and the position error.

7. A positioning control apparatus comprising:

an actuator for moving a head in a radial direction of a disk;

position detecting means responsive to a servo signal recorded on the disk for determining the position of the head;

residual track number detecting means for determining a residual track number on the basis of a target position and the position of the head;

a velocity controller for determining a target velocity corresponding to the residual track number and for driving said actuator to cause said actuator to move the head toward the target position by causing the difference between the target velocity and the velocity of the head to be zero;

a position controller, including a compensator producing a control signal on the basis of the position error, for driving said actuator to cause said actuator to move the head to the target position by causing the difference between the target position and the position of the head to be zero;

switching means for switching driving of said actuator from said velocity controller to said position controller when the residual track number reaches a predetermined value; and a computer for receiving the target position, the position of the head and the velocity of the head, for determining coefficients for initial values for said position controller on the basis of the target position, for computing the initial values from the position of the head and the velocity of the head at time of switching determined coefficients, and for applying the computed initial values to said compensator.

* * * * *